(No Model.)
F. HABERMAN & C. REGAN.
SHEET METAL VESSEL.
No. 597,645. Patented Jan. 18, 1898.
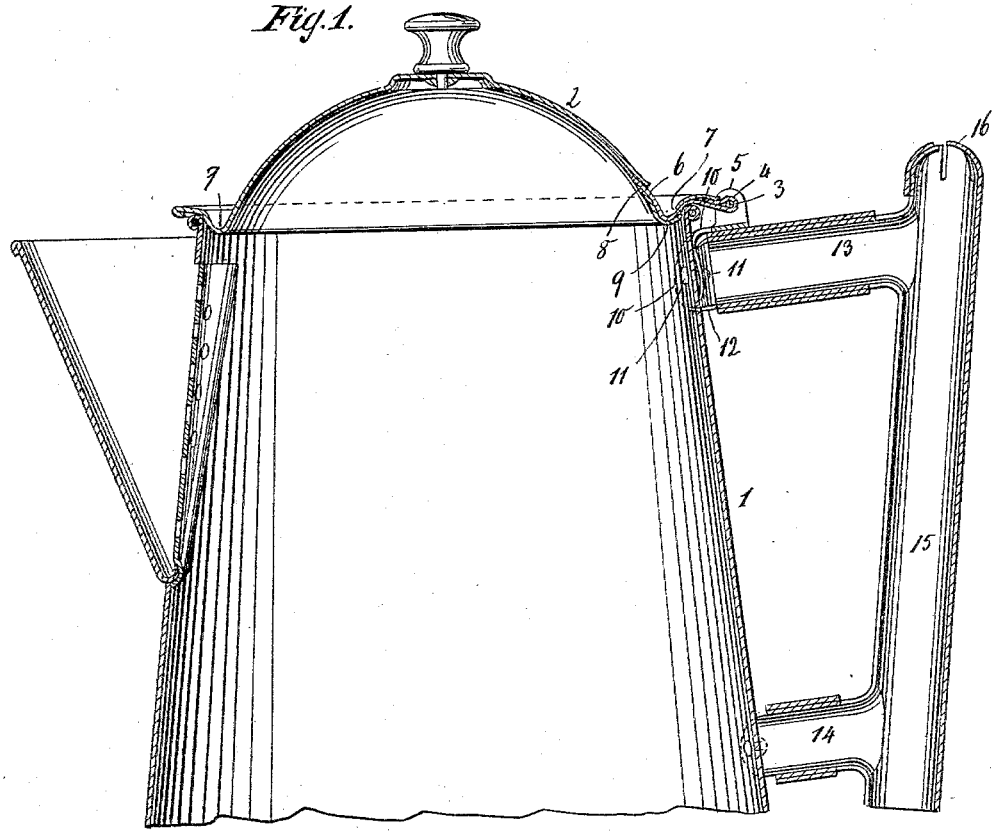
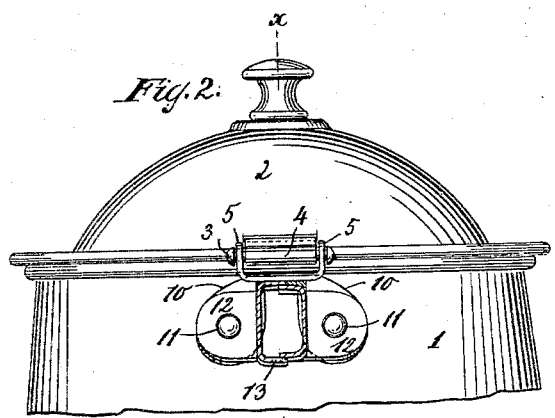
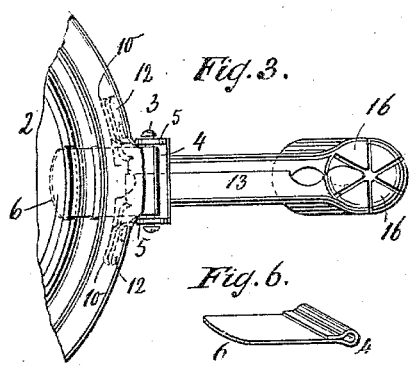
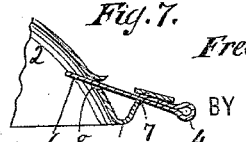
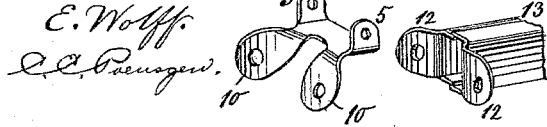
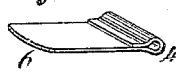
WITNESSES:
E. Wolff
C. C. Poensgen
INVENTORS:
Frederick Haberman.
Cornelius Regan.
BY
Hauff & Hauff
ATTORNEYS.

UNITED STATES PATENT OFFICE.

FREDERICK HABERMAN, OF NEW YORK, AND CORNELIUS REGAN, OF MASPETH, NEW YORK, ASSIGNORS TO THE HABERMAN MANUFACTURING COMPANY, OF NEW YORK, N. Y.

SHEET-METAL VESSEL.

SPECIFICATION forming part of Letters Patent No. 597,645, dated January 18, 1898.

Application filed May 27, 1897. Serial No. 638,435. (No model.)

*To all whom it may concern:*

Be it known that we, FREDERICK HABERMAN, residing at New York, in the county of New York, and CORNELIUS REGAN, residing at Maspeth, in the county of Queens, State of New York, citizens of the United States, have invented new and useful Improvements in Sheet-Metal Vessels, of which the following is a specification.

By means of this invention a sheet-metal vessel can be readily provided with a handle and with a hinged or swinging cover without solder or in a manner adapted for enameling, in which exposure to intense heat is required; and the invention resides in the novel features of construction set forth in the following specification and claim and illustrated in the annexed drawings, in which—

Figure 1 is a sectional elevation of a vessel. Fig. 2 is a rear elevation of Fig. 1, partly in section. Fig. 3 is a plan view of Fig. 1. Fig. 4 is a detail view of a pintle or hinge bearing. Fig. 5 shows rivet-flanges of the handle. Fig. 6 shows another pintle or pivot bearing. Fig. 7 shows the means for attaching a pintle-bearing to the cover.

The vessel 1 is shown with a cover 2, hinged by the pintle 3 in bearings 4 and 5. The bearing 4 has a tongue 6, which is shown in Fig. 7 passed into perforations 7 and 8, located at opposite sides of the channel or channeled rim portion 9 of the cover. When the tongue 6 is bent from the straight shape shown in Fig. 7 into or to conformity with the channel 9, as seen in Fig. 1, said tongue, with bearing 4, will be secured or held in place. The second hinge-bearing 5 has flanges 10, perforated or adapted for the engagement of rivets 11. The rivet-flanges 12 of the handle are also adapted for the engagement of these rivets 11, and when the flanges 10 are made to coincide with flanges 12 or are placed between the flanges 12 and a side of vessel 1 the rivets can be made to secure the vessel and bearing 5, with the handle, to one another.

The handle can be formed from a suitable sheet-metal blank to form stems 13 and 14, with tubular body 15. The body part 15 is shown with its top formed into or provided with serrations 16, which, having their apexes bent toward one another, will close the handle-body at its top or end. The stem 14, like stem 13, is riveted to vessel 1.

What we claim as new, and desire to secure by Letters Patent, is—

A vessel provided with a hinged cover having a channeled rim portion and with perforations located at opposite sides of the channel, and a hinge-bearing having a tongue passed into said perforations and bent into the channel substantially as described.

In testimony whereof we have hereunto set our hands in the presence of two subscribing witnesses.

FREDERICK HABERMAN.
CORNELIUS REGAN.

Witnesses:
   D. S. SERVOSS,
   A. M. STEINHARDT.